April 19, 1949.  H. S. KIRSCHBAUM  2,467,753
REGULATING SYSTEM
Filed Oct. 20, 1945
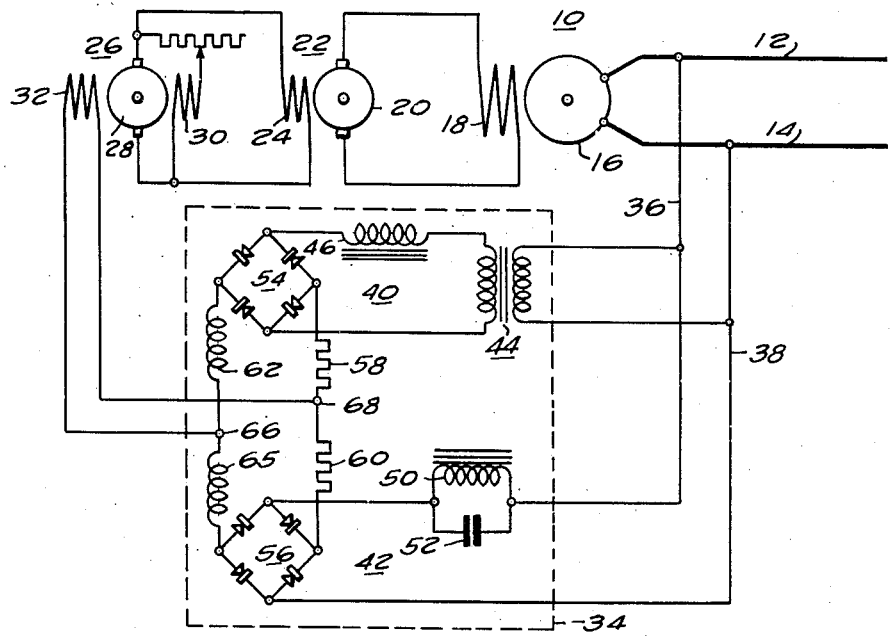
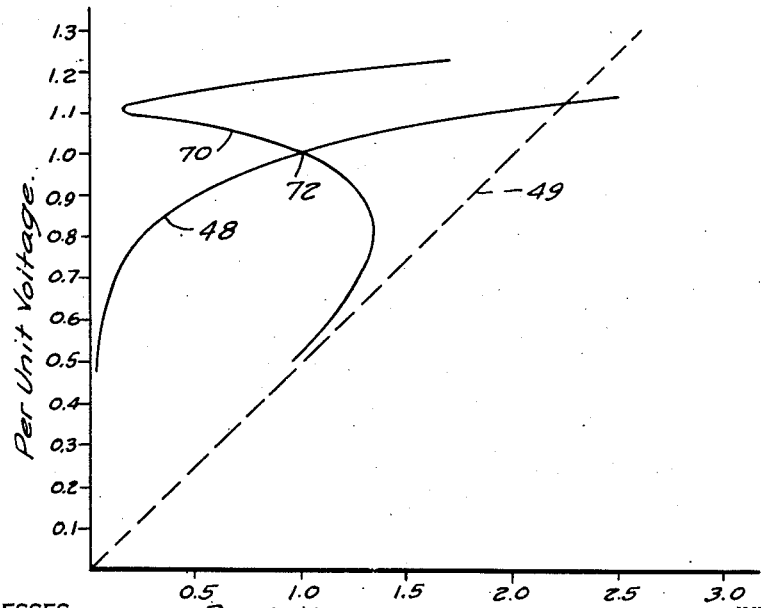
WITNESSES:  INVENTOR
  Herbert S. Kirschbaum.
  BY
  James K. Ely
  ATTORNEY Patented Apr. 19, 1949

2,467,753

UNITED STATES PATENT OFFICE 2,467,753

REGULATING SYSTEM

Herbert S. Kirschbaum, Pittsburgh, Pa., assignor to Westinghouse Electric Corporation, East Pittsburgh, Pa., a corporation of Pennsylvania Application October 20, 1945, Serial No. 623,593

3 Claims. (Cl. 322—28)

This invention relates to regulating systems and in particular, to voltage reference networks utilized in regulating systems.

Regulating systems have been utilized which embodied networks for discovering any departure from a given electrical quantity, such as a line voltage from normal, and the output of such networks have been amplified to effect a correction in the departure of the electrical quantity. The networks utilized drew considerable energy from the line in order to deliver sufficient energy to the amplifiers, and as a result, were not as efficient as desired.

One of the most common networks utilized heretofore comprised a saturating reactor and a linear impedance which draw the same current at a predetermined voltage level, the impedances having the characteristics that at voltages higher than the predetermined level, the saturating reactor draws more current than the linear impedance, and at a lower level, the linear impedance draws more current than the saturating reactor. With such networks, the current from the saturating reactor was rectified and passed through a resistor, and the current from the linear impedance was rectified and passed through another resistor, the difference in voltage between the two resistors being used to initiate a regulating operation to correct for the department from normal. Such systems required the absorption of considerable energy in the two resistors as well as a considerable reduction in the efficiency of the saturating reactor section as a constant voltage device.

Recently there has been developed a more efficient regulating system which utilized a network formed of a linear and non-linear impedance as disclosed and claimed in co-pending application, Serial No. 567,256, filed December 8, 1944, in the names of E. L. Harder, et al, now Patent 2,428,-566, issued October 7, 1947, which is an efficient system for controlling the field current of a regulating machine. In a number of instances, however, service requirements are such as to require more field current for a given deviation from a predetermined line voltage than can be obtained with the system disclosed in said co-pending application.

An object of this invention is to provide a regulating system having a voltage reference network which is fast operating with a maximum output for a minimum input and which is easily constructed.

Another object of this invention is to provide a regulating system having a voltage reference network comprising two non-linear impedance circuits having predetermined voltage-current characteristics.

Other objects of this invention will become apparent from the following description when taken in conjunction with the accompanying drawing in which:

Fig. 1 is a diagrammatic representation of a regulating system embodying the apparatus and circuits of this invention, and Fig. 2 is a graph, the curves of which represent the characteristics of the non-linear impedance circuits utilized in the system of Fig. 1.

Referring to Fig. 1, there is illustrated a regulating system representing an embodiment of this invention. In the figure, a generator 10 is illustrated as supplying an alternating load system represented by conductors 12 and 14. The generator 10 comprises the armature windings 16 and the field windings 18, the field windings being connected across the armature windings 20 of an exciter 22, which is also provided with field windings 24.

In order to provide normal excitation for the exciter 22 and to regulate the output of the generator 10, a regulating generator 26 is employed as illustrated. The regulating generator 26 is provided with an armature winding 28 connected across the field windings 24 of the exciter 22, a self-exciting field winding 30 being connected across the armature winding 28 to provide normal excitation for the regulating generator when the generator 10 is operated to maintain normal line voltage across the conductors 12 and 14. The regulating generator 26 is also provided with a control field winding 32 which is disposed to be normally de-energized when the generator 10 is operating to maintain normal line voltage and is directionally energized as the line voltage departs, that is, raises or lowers from normal to so excite the generator 26 as to correct the excitation of the generator 10 to correct for such departure and maintain the line voltage substantially at its normal value.

The control field winding 32 is connected through a voltage reference network 34 connected by conductors 36 and 38 to be supplied in accordance with the voltage across conductors 12 and 14. The voltage reference network 34 in the embodiment illustrated comprises a non-linear impedance circuit 40, and a second non-linear impedance circuit 42, connected to be simultaneously energized in accordance with the line voltage.

The non-linear impedance circuit 40 is connected through an insulating transformer 44 to conductors 36 and 38, the transformer preferably having a one to one ratio. As illustrated, the non-linear impedance circuit 40 includes a saturating reactor 46 having a voltage-current or impedance characteristic curve of the exponential type, as illustrated by curve 48 of Fig. 2.

The second non-linear impedance circuit 42 includes a saturating reactor 50 and a capacitor 52 connected in parallel circuit relation. In practice, the capacitor 52 which by itself has an impedance characteristic curve as shown by curve 49 of Fig. 2, is selected to have substantially one-half the impedance of the saturating reactor 50 at the balance point or point of intersection 72 illustrated in Fig. 2 and explained more fully hereinafter, the saturating reactors 50 and 46 being substantially identical and of the same value of impedance.

As illustrated, the non-linear impedance circuits 40 and 42 are connected across dry-type rectifier units 54 and 56, respectively, the output terminals of the rectifier units being connected in a series circuit relation with each other. In order to insure that the rectifier voltages remain positive for a predetermined change in the line voltage, a resistor 58 is associated with the rectifier 54, and a resistor 60 is associated with the rectifier 56, the resistors 58 and 60 being connected in series circuit relation in the output circuits of the rectifiers. Smoothing reactors 62 and 65 are also connected in series circuit relation in the output circuits of the rectifiers 54 and 56.

In order to control the directional energization of control field winding 32, the winding is connected across the direct current series circuit connecting the rectifier units 54 and 56 at points 66 and 68, which points at normal line voltage are at zero potential. For an unbalance between the rectifier units, the control field winding 32 is energized in one or the other directions to effect a change in the excitation of the regulating generator 26.

As explained hereinbefore, the non-linear impedance circuit 46 has an impedance characteristic curve of the exponential type, as represented by curve 48 in Fig. 2. Contrasted with the impedance characteristic curve of the non-linear impedance circuit 40, the non-linear impedance circuit 42 has a voltage-current or impedance characteristic curve of the ferro-resonance type, as illustrated by curve 70 of Fig. 2. This curve is particularly representative of the impedance characteristics where the capacitor 52 is of one-half of the impedance value at the balance point 72 of the reactor 50, which is connected in parallel circuit relation thereto. It will be appreciated that the shape of the curve may be changed somewhat by varying the relative values of the capacitor 52 and reactor 50, which are connected in parallel circuit relation in the non-linear impedance circuit 42.

As shown, the two non-linear impedance circuits 40 and 42 have intersecting impedance characteristics so that as the line voltage varies from the normal, or balance point, as represented by the intersecting point 72 of the characteristic curves of Fig. 2, such as for a raise in voltage, the saturating reactor 46 draws more current than the parallel connected impedances of circuit 42, and for a decrease in voltage the parallel connected impedances 50 and 52 of circuit 42 draw more current than the reactor 46 of circuit 40.

In operation, assuming that the generator 10 of exciter 22 and regulating generator 26 are driven by any suitable means (not shown) for supplying power at a constant voltage to a load (not shown), the self-excited field winding 30 of the regulating generator 26 is sufficient for so exciting the regulating generator 26 to maintain the output of the exciter 22 sufficient to maintain the excitation of the generator 10 to maintain constant voltage across the line conductors 12 and 14. Under such operating conditions, the two non-linear impedance circuits 40 and 42 have intersecting impedance characteristics, as shown at point 72 of Fig. 2, so that the voltages across the rectifier units 54 and 56 and, consequently, the common points 66 and 68, are equal and so balanced that a voltage drop does not appear across the control field winding 32.

If the line voltage should increase above the predetermined value, then the non-linear impedance circuit 40 draws more current than the non-linear impedance circuit 42 and the output voltages across the dry type rectifier units 54 and 56 are unbalanced. With such an unbalanced condition the larger potential across the rectifier unit 54 effects a voltage drop across the control field winding 32 in a direction to oppose the excitation of the field winding 30 to decrease the output from the regulating generator 26, whereby the output of the exciter 22 is also decreased, with the result that the excitation of the generator 10 is so decreased as to return the line voltage to its predetermined value.

If the change in the line voltage is a decrease from the predetermined value, then the non-linear impedance circuit 42 draws more current than the non-linear impedance circuit 40 and the output of the rectifying units 54 and 56 is so unbalanced as to effect a voltage drop across the control field winding 32 in the reverse direction to aid the self-energizing field winding 30 to increase the excitation of the regulating generator 26. Under such conditions of operation, the excitation of the exciter 22 and of the main generator 10 is so increased as to effect an increase in the line voltage to maintain the line voltage at its predetermined normal value.

By utilizing the system of this invention, it is found that a fast and efficient regulation is obtained, for, as illustrated by the intersecting impedance characteristic curves of the two non-linear impedance circuits, a very large change in current drawn by the two circuits is obtained for a slight change in voltage from the predetermined value which is to be regulated. This large unbalance makes it possible to obtain a fast and positive corrective operation of the regulating generator 32. Further, it is to be noted that the elements utilized in the network are of standard construction so that the system of this invention can be readily duplicated.

I claim as my invention:

1. In a regulating system for maintaining an electrical quantity substantially constant, in combination, a network disposed to be energized in accordance with the electrical quantity and responsive to variations therein to produce a directional output from the network, the network comprising a first non-linear impedance circuit and a second non-linear impedance circuit disposed to be simultaneously energized in accordance with the electrical quantity, the first non-linear impedance circuit having a voltage-current characteristic curve of the exponential type, the second non-linear impedance circuit having a voltage-current characteristic curve of the ferro-resonance type, the curves of the two circuits being of opposite direction and intersecting at a predetermined voltage whereby the outputs therefrom are balanced at said predetermined voltage, a dry type rectifier unit connected to be supplied by the first non-linear impedance circuit, another dry type rectifier unit connected to be supplied by the second non-linear circuit, the rectifier units having output terminals connected in series circuit relation with each other whereby a circulating current flows therethrough, and means connected in circuit relation with the series connected rectifier units disposed to be directionally energized in response to an unbalanced potential across the output terminals of the rectifying units as the voltage of the impedance circuits varies from the predetermined voltage to control the electrical quantity.

2. In a regulating system for maintaining an electrical quantity substantially constant, in combination, a network disposed to be energized in accordance with the electrical quantity and responsive to variations therein to produce a directional output from the network, the network comprising a first non-linear impedance circuit and a second non-linear impedance circuit disposed to be simultaneously energized in accordance with the electrical quantity to produce independent output voltages therefrom, the first non-linear impedance consisting of a saturating reactor, the second non-linear impedance consisting of a saturating reactor and a capacitor connected in parallel circuit relation, a dry type rectifier unit connected to be supplied by the first non-linear impedance circuit, another dry type rectifier unit connected to be supplied by the second non-linear circuit, the rectifiers having output terminals connected in series circuit relation with each other whereby a circulating current flows therethrough, and a control means connected in circuit relation with the series connected rectifier units disposed to be directionally energized in response to an unbalance potential across the output terminals of the rectifying units as the voltages of the impedance circuits vary to thereby control the electrical quantity.

3. In a regulating system for maintaining an electrical quantity substantially constant, in combination, a network disposed to be energized in accordance with the electrical quantity and responsive to variations therein to produce a directional output from the network, the network comprising a first non-linear impedance circuit and a second non-linear impedance circuit disposed to be simultaneously energized in accordance with the electrical quantity, the first non-linear impedance consisting of a saturating reactor, the second non-linear impedance consisting of a saturating reactor and a capacitor connected in parallel circuit relation, the saturating reactors of the impedance circuits being of substantially the same impedance value with the capacitor at substantially one-half said impedance value at a predetermined voltage to provide intersecting impedance characteristics at said predetermined voltage, a dry type rectifier unit connected to be supplied by the first non-linear impedance circuit, another dry type rectifier unit connected to be supplied by the second non-linear impedance circuit, the rectifier units having output terminals connected in series circuit relation with each other whereby a circulating current flows therethrough, and means connected in circuit relation with the series-connected rectifier units disposed to be directionally energized in response to an unbalanced potential across the output terminals of the rectifying units as the voltage of the impedance circuits varies from the predetermined voltage to control the electrical quantity.

HERBERT S. KIRSCHBAUM.

REFERENCES CITED

The following references are of record in the file of this patent:

UNITED STATES PATENTS

| Number | Name | Date |
| --- | --- | --- |
| 1,763,014 | Stacy et al. | June 10, 1930 |
| 2,194,299 | Edward et al. | Mar. 19, 1940 |